(12) United States Patent
King et al.

(10) Patent No.: US 7,529,807 B1
(45) Date of Patent: May 5, 2009

(54) COMMON STORAGE IN SCALABLE COMPUTER SYSTEMS

(75) Inventors: James E. King, Wokingham (GB); Martin P. Mayhead, Hindhead (GB)

(73) Assignee: Sun Microsystems, Inc., Santa Clara, CA (US)

( * ) Notice: Subject to any disclaimer, the term of this patent is extended or adjusted under 35 U.S.C. 154(b) by 1014 days.

(21) Appl. No.: 10/839,596

(22) Filed: May 5, 2004

(51) Int. Cl.
*G06F 15/16* (2006.01)
(52) U.S. Cl. .................................. 709/217; 711/115
(58) Field of Classification Search ......... 709/200–203, 709/217–227; 711/115
See application file for complete search history.

(56) References Cited

U.S. PATENT DOCUMENTS

| | | | |
|---|---|---|---|
| 6,862,693 B2 * | 3/2005 | Chaudhry et al. | 714/11 |
| 7,058,545 B2 * | 6/2006 | Chang et al. | 702/186 |
| 7,127,498 B2 * | 10/2006 | Chang et al. | 709/217 |
| 7,225,355 B2 * | 5/2007 | Yamazaki et al. | 714/12 |
| 7,249,347 B2 * | 7/2007 | Chang et al. | 717/113 |

OTHER PUBLICATIONS

"Data Storage Design, Backup, and Restore for Win," Microsoft Office Internet Platform, www.microsoft.com/technet/prodtechnol/windowserver2003/technologies/sharepoint, Nov. 1, 2003, (12 pages).

* cited by examiner

*Primary Examiner*—Moustafa M Meky
(74) *Attorney, Agent, or Firm*—Meyertons Hood Kivlin Kowert & Goetzel, P.C.

(57) ABSTRACT

A computer system comprises a plurality of processing modules, each operable to provide a service to an external entity. Each processing module has a processor and a memory. A storage module is provided, operable to store information required by the processing modules to provide the service. A switching module is also provided, operable to provide a switching service between the processing module and storage module and between the processing module and an external entity.

16 Claims, 4 Drawing Sheets

COMMON STORAGE IN SCALABLE COMPUTER SYSTEMS

BACKGROUND OF THE INVENTION

The present invention relates to storage and in particular, but not exclusively, to low administration virtualised storage.

One application for the present invention relates to high density computer systems, for example, computer server systems for web-server applications. In web-server applications, it is important to provide high reliability and high capacity of operation. Computer systems which can be used for web-server type applications include horizontally scaled computer systems or network backplane computer systems, which comprise a number of individual servers having distributed applications running thereon, as well as switching and management provision for the servers. The servers in horizontally scaled computer systems need storage space for operating system and application file storage as well as data storage for the application(s) running on the servers. As the applications running on a given server are not necessarily predetermined at the time of constructing the server or horizontally scaled computer system, the storage requirements of each server may not be known until applications are run thereon.

SUMMARY OF THE INVENTION

According to a first aspect, there is provided a computer system comprising a plurality of processing modules, each operable to provide a service to an external entity. Each processing module has a processor and a memory. A storage module is provided, operable to store information required by the processing modules to provide the service. A switching module is also provided, operable to provide a switching service between the processing module and storage module and between the processing module and an external entity. This arrangement allows a single storage provision within the computer system to distribute identical operating instructions and application data to a plurality of server computers, thus providing a low management overhead, high reliability computer system as a single distributable package, ready for use "out of the box".

According to a second aspect, there is provided a computer system configurable to provide a service to a remote entity. The computer system comprises at least two server computers configurable to operate to provide a service and a storage unit configured to store operating instructions and data for each of the at least two server computers. The computer system further comprises a switch unit operable to provide a communications channel between the at least two server computers and the storage unit and to provide a communications channel between the at least two server computers and a remote entity. The storage unit is configured to store common operating instructions and data for more than one said at least two server computers and to provide those common operating instructions and data to more than one said at least two server computers. This arrangement creates a low management overhead, high reliability computer system capable of providing identical operating instructions to multiple processing engines, to provide a bank or farm of identically programmed processing engines for service providing.

Another aspect provides a method of operating a computer system comprising storing sets of common operating instructions and data for groups of server computers of the computer system in a storage unit of the computer system; and providing access to a respective one of said sets of common operating instructions and data by a respective group of said server computers of the computer system in accordance with a managed filesystem to preserve the integrity of said common operating instructions and data. This technique allows a plurality of processing engines to be programmed using common instructions and application data to service provision, whilst maintaining the common instructions and data in a protected manner to allow use of those instructions by any of the processing engines without corruption of the common set or inconsistencies between processing engines.

A further aspect provides a method of operating a computer system comprising: storing information essential for the provision of a service by processing modules of the computer system in a common information repository of the computer system; providing access to the information to processing modules of the computer system such that at least a plurality of processing modules of the computer system are provided with access to the same information; and controlling access to the information to maintain the integrity of the original information in the common information repository. Thus a technique is set out for multiple distribution of a common set of instructions and data to a plurality of server computers within a horizontally scaled computer system, thereby allowing efficient, low management overhead programming of the system to achieve a reliable provision of service.

BRIEF DESCRIPTION OF THE FIGURES

Embodiments of the present invention will be described hereinafter, by way of example only, with reference to the accompanying drawings in which like reference signs relate to like elements and in which.

Figure 1:
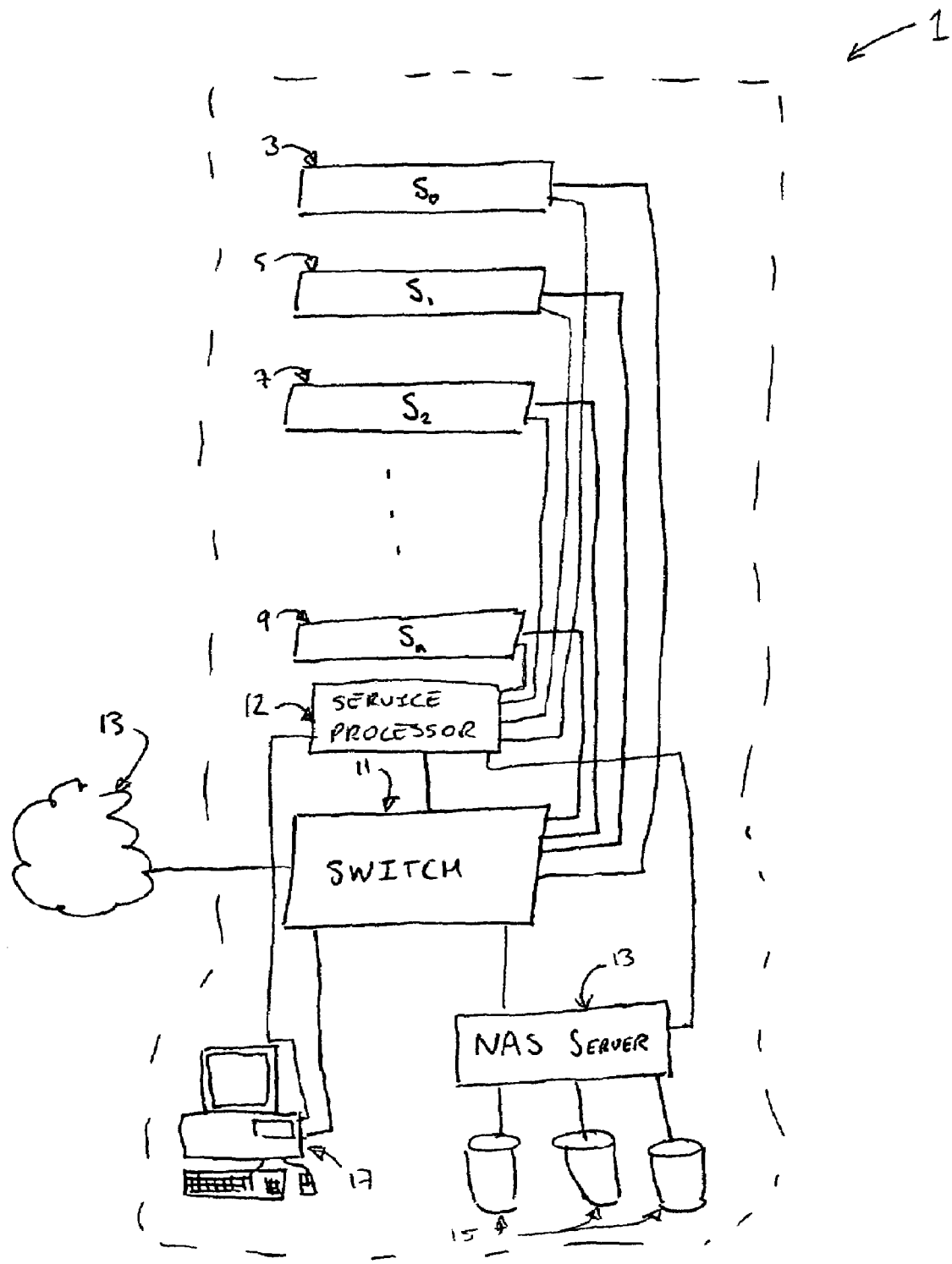
FIG. 1 is a schematic representation of a multi-server computer system with centralised storage.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DESCRIPTION OF PARTICULAR EMBODIMENTS

Embodiments and examples are described hereafter by way of example only in the following with reference to the accompanying drawings.

FIG. 1 shows an example of a computer system 1 in which a number of computer servers are provided. In the present example the servers are designated $S_0$ (3), $S_1$ (5), $S_2$ (7) through $S_n$ (9). Each server 3, 5, 7, 9 of the present example comprises at least one processor, random access memory for the processor and a data communication interface to enable the server to communicate externally. In the present example the data communication interface is a 10 Gb Ethernet interface. In other examples, the data communication interface can be any interface capable of providing sufficient performance for the intended application for which the servers are to be used, suitable examples include other Ethernet standards and Infiniband interfaces.

Each server 3, 5, 7, 9 can also comprise a local management entity for providing local management services to the server and can also have ancillary devices such as cooling fans. The servers can also be provided with non-volatile memory for storage of system parameters, such as a unique identifier for the server. The servers of the present example have rack-mount housings for mounting in a conventional computer racking system.

Each of the servers 3, 5, 7, 9 can be connected into a switch 11 via the data communication interface. The switch 11 can have a rack-mount housing for mounting in a racking system with the servers 3, 5, 7, 9.

By means of the switch 11, the servers 3, 5, 7, 9 can communicate with client entities remote the computer system 1. Communication channels to such client entities can be provided via an external network 14, such as an intranet or the Internet.

The client entities can use the services provided by the servers 3, 5, 7, 9 of the computer system 1. In some examples, security provisions (not shown) such as encryption, access control, virus protection or firewall can be provided to protect the computer system 1 from malicious attack. Such security provisions can be provided within the computers system 1, for example within switch or a separate unit, or by an external system operable to intercept communication between the computer system 1 and the network 14 and apply the security measures thereto.

Providing storage for the servers 3, 5, 7, 9 is an NAS (Network Attached Storage) server 13, to which are connected a plurality of physical hard disk drives 15. The operation of the NAS server 13 and disks 15 will be described in more detail with reference to FIGS. 3 to 5 below.

The computer system 1 can also include a service processor 12. The service processor 12 of the present example can communicate with each of the servers 3, 5, 7, 9, the switch 11 and the NAS server 13 via dedicated management connections. In other examples, communication between the service processor 12 and the servers and NAS server can be performed via the switch 11. The service processor 12 can provide a number of local management services for the computer system 1.

The computer system 1 also includes a management console 17. The management console 17 can comprise a management computer with user input and display devices and can be accessed by a computer system technician or administrator for performing user-driven management tasks. In some examples, the management console 17 can communicate directly with the service processor 12 via a dedicated management console connection.

Figure 2:
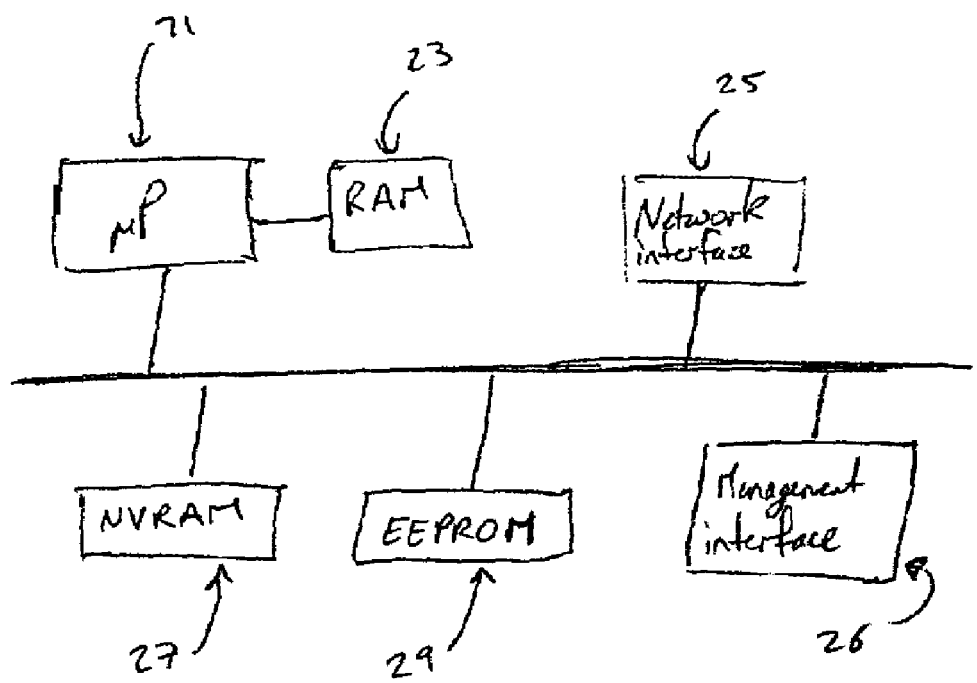
FIG. 2 is a schematic representation of internal components of a server for the computer system of FIG. 1.

Referring now to FIG. 2, in the present example, each server 3, 5, 7, 9 comprises a processor 21 which is provided with RAM 23 for storage of operating system and application instructions and data during operation of the server. Also provided are a network interface 25 for providing the connection to the switch 11, and a management interface 26 for providing the connection to the service processor 12. As the server of the present example has no local hard disk or similar long-term storage, all access to such storage for the server is provided by the NAS server 13 via the switch 11. In some examples, dual network interfaces 25 can be provided to allow for a dual redundant connection between the server and combined switch and service processor unit to avoid a single point of failure in the network connections.

The server also has a memory, NVRAM 27, for storing startup instructions and parameters, for example, OBP (open boot PROM) program instructions. By means of such instructions and parameters, the processor can be caused to access the remote storage at the NAS server 13 using the network interface 25 to load operating system and application software. The server can also comprise a further memory, EEPROM 29, which can store server-specific information, such as an identifier code unique to the server which can be used for management purposes. The EEPROM 29 can also be used to store data describing the server which may be useful for management purposes, for example: total operational hours, logged temperature data, total overtemperature events, total software failure events etc. As will be appreciated, the roles of the NVRAM 27 and EEPROM 29 could be provided by a single physical memory device.

Upon startup, the servers can be configured automatically to access boot parameters and locations via the network to which they are connected. This process can include a DHCP (dynamic host configuration protocol) request to a DHCP server of the network (not shown, can be implemented within the switch, within the service processor, within the NFS server or as a separate unit). In response to the request, the DHCP server provides the server with a path to a file to download across the network. The file can be downloaded using TFTP (Trivial File Transfer Protocol), which is a simplified form of the well known File Transfer Protocol or FTP. The file can be a read-to-execute binary file which, upon execution at the server provides the server with all of the drivers necessary to access the NFS filesystem and can include DHCP information describing the path for the NFS data. In some examples, the binary file can be application specific, containing data to direct the server to a particular fixed path on the NFS server with any alternative available paths being accessed by the DHCP server providing different binary files for each alternative path according to a decision process at the DHCP server to choose a boot path for the server from the available alternatives.

Figure 3:
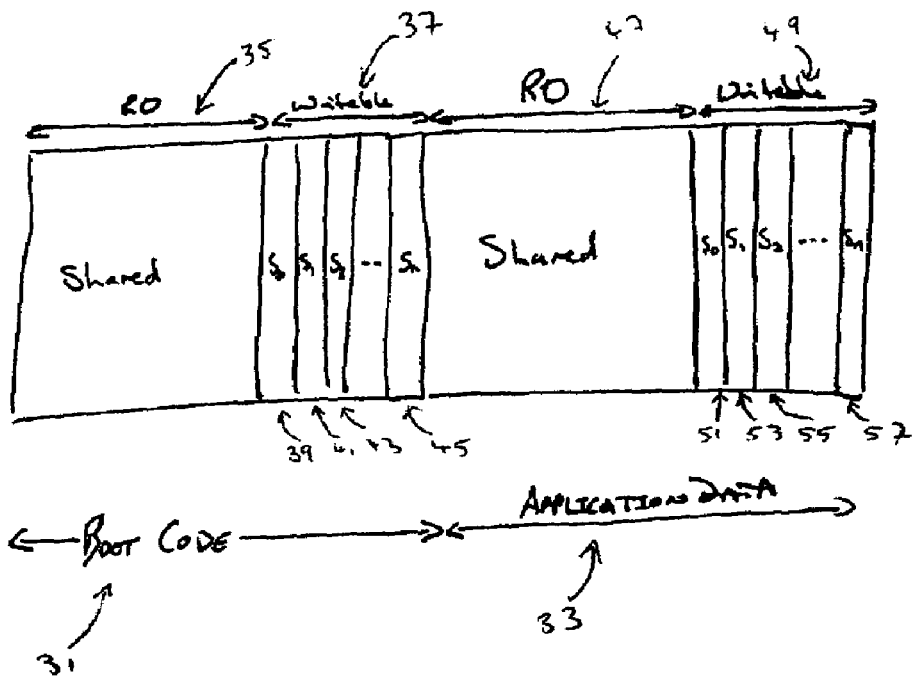
FIG. 3 is a schematic representation of a logical division of storage for the system of FIG. 1.
Figure 4:
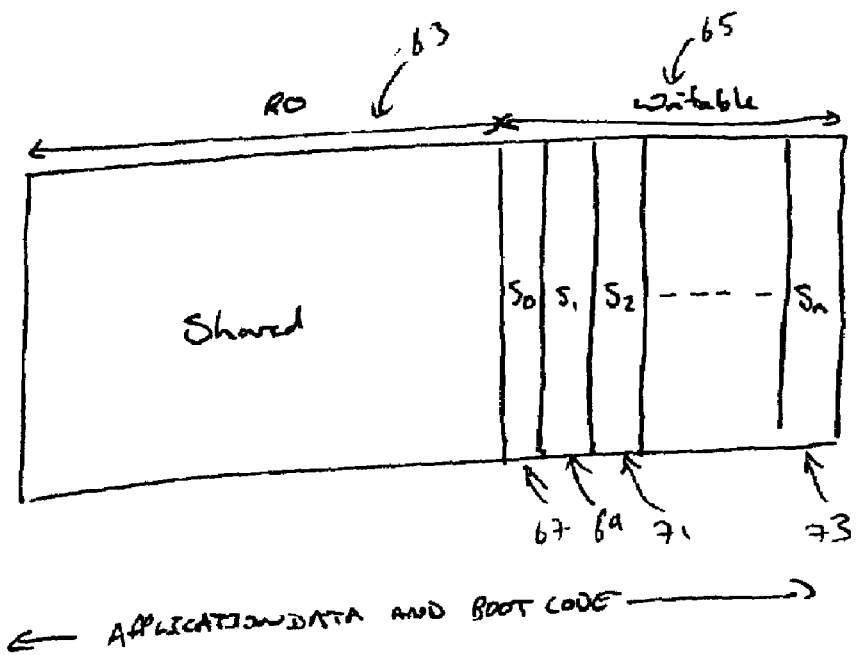
FIG. 4 is a schematic representation of another logical division of storage for the system of FIG. 1.
Figure 5:
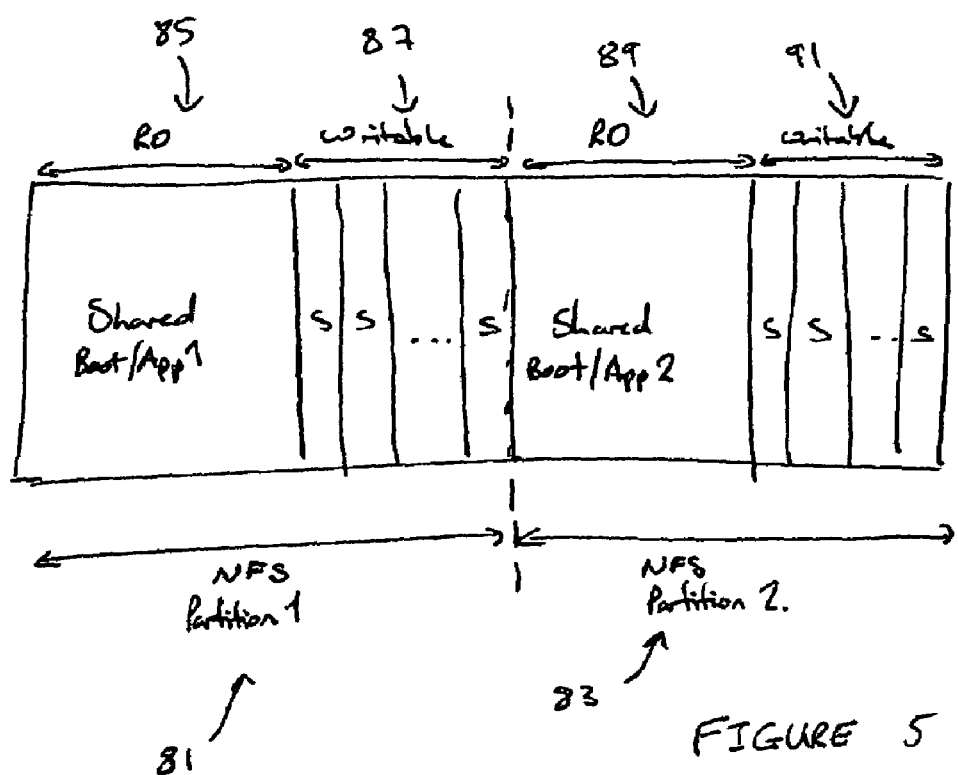
FIG. 5 is a schematic representation of a further logical division of storage for the system of FIG. 1.

With reference to FIGS. 3 to 5, there will now be described a number of examples of ways in which the storage provided by the NAS server 13 can be implemented.

The NAS server 13 of the present example uses the NFS (network file system) protocol for implementation of access to the physical storage and uses a COW (copy on write) filesystem. The entire filesystem can be virtualised, so that the "disks" or "partitions" which may be made available to the servers 3, 5, 7, 9 take the form of logical disks and partitions. Such logical disks and partitions can be configured to allow multiple-access, i.e. partitions which can be read from and/or written to by more than one server 3, 5, 7, 9. The physical disks 15 on which the data is stored can typically be configured as a hardware RAID (redundant array of independent disks) to provide redundancy and reliability of operation, thus increasing system availability.

FIG. 3 shows a first example of a logical arrangement of the storage provided by the NAS server 13 on the physical disks 15. In this example, the total storage volume available is divided into two broad category areas, one area 31 for boot code including operating system files, and the other area 33 for application data including application software files.

The boot code area 31 is split into a read-only portion 35 and a writeable portion 37. The read-only portion 35 can be read by all of the servers 3, 5, 7, 9 and contains all of the operating system files, operational parameters and other configuration information required by each of the servers 3, 5, 7, 9. Note that in the present example each of the servers 3, 5, 7, 9 is identically configured and runs the same application software on the same operating system. The writeable portion 37 is divided into a number of partitions, each addressable by a selected one of the servers 3, 5, 7, 9. Thus a partition 39 is allocated to server $S_0$, a partition 41 is allocated to server $S_1$, a partition 43 is allocated to server $S_2$ and a partition 45 is allocated to server $S_n$. These server specific partitions are provided for the servers to be able to write to disk information relating to the boot process and the operating system specific to that server. In order to ensure that such written information is correctly used the next time that a server is restarted, the written information includes a pointer to the place in the read-only code where the written information belongs. This pointer is used by the NFS server to make this written data appear to be in the correct place within the read/write filesystem exposed to the server. In the present example, typical sizes of the various areas in the boot code part 31 can be approximately 1 GB for the shared portion 35 and a few KB for each of the server specific portions.

The application data area 33 is split into a read-only portion 47 and a writeable portion 49. The read-only portion 47 can be read by all of the servers 3, 5, 7, 9 and contains all of the application software files and initial information values required to run the application software on each of the servers 3, 5, 7, 9. The writeable portion 49 is divided into a number of partitions, each addressable by a selected one of the servers 3, 5, 7, 9. Thus a partition 51 is allocated to server $S_0$, a partition 53 is allocated to server $S_1$, a partition 55 is allocated to server $S_2$ and a partition 57 is allocated to server $S_n$. These server specific partitions are provided for the servers to be able to write to disk information relating to the application software and the information values associated therewith. In order to ensure that such written information is correctly used the next time that a server is restarted, the written information includes a pointer to the place in the read-only code where the written information belongs.

Control of the writing to the server allocated partitions can be performed by intelligent control within the NAS server 13. When each server addresses the storage, it is provided access to what appears to be a single partition of the size predetermined by the NAS server 13. The server then reads and writes data as normal to that single partition. The NAS server 13 then intercepts any writes and converts them into the written-data-plus-pointer format used to actually store the results of the write operation in the COW filesystem.

In some examples, the "partitions" allocated to each of the various purposes (shared read-only and private writeable, boot-code and application data) can be implemented in a single large logical partition. As such, all the files within that partition are tagged by NFS server with access permissions so that it knows which files are accessible by which server and which are read-only. In this way all the files on the read-only partition described above are tagged as read-only and accessible by all servers, whereas all the files that were on the individual server-specific read/write partitions are tagged as read/write for one specific server. The NFS server has to be able to handle multiple files with identical names within a single logical partition. This arrangement provides great flexibility in that the entire storage space is available for sharing without a need for partition management.

Alternatively, the read-only spaces can be implemented as separate logical partitions as these spaces are not expected to be resized frequently basis during operation of the computer system 1, and the writeable spaces can be implemented as tagged files in a common logical partition, separate to the read-only partition. The use of tagged files allows instant dynamic resizing of the server allocated spaces up to the maximum size of the logical partition in which they are located and also allows the use of conventional performance enhancing techniques such as defragmentation agents for maximising the performance of the partition.

The use of the shared COW filesystem of this example allows less total storage to be provided to the computer system 1 than if separate storage were provided to each server. This is because the, inevitably large amounts of, storage required for the common operating system and application data need only be provided once, and only the writeable space need be provided on a per server basis.

By using a COW filesystem over a NAS protocol such as NFS, the server software (operating system and application software) needs no modification from software than would otherwise be installed directly onto a hard disk drive in each server. Thus there is no need to research, buy and configure new software for the computer system if using such a system to replace an existing local storage based solution.

The NAS server 13 can also resize the various partitions dynamically whilst the computer system 1 is operational, thereby providing a greater amount of storage space to those servers requiring more space, when such space becomes necessary. As the COW filesystem is virtualised over a, for example, hardware RAID arrangement, the total amount of available storage can easily be varied by adding or removing physical disks from the hardware RAID arrangement. The NAS server 13 is then able to adjust the sizes of the various partitions using the new amount of total storage available.

Additionally, it is possible to add additional servers to the computer system with minimum management overhead. The server simply need be connected into the switch 11 (and service processor 12). The service processor 12 can autodetect the new server, or external management commands, for example entered via the management console 17, can be used to configure the service processor 12 to recognise the new server. The new server is then provided with operating system and application data from the image already existent within the COW filesystem and the NAS server 13 can provide a new writeable storage area or file tag for the new server within the COW filesystem.

To minimise the management overhead for a user of computer system 1, the entire system can be supplied with the necessary operating system already installed into a pre-configured NFS partition (for example into partition 35). Thus all that the user has to do is turn on the boxes supplied to them, install the application software (for example into partition 47) and the system is ready to be used. In some arrangements, the application software can also be pre-installed. As will be appreciated, the operating system and application data image on the NFS filesystem can be replaced or updated to allow the system to be reprogrammed to use different and/or improved operating system and/or application data. Writing of a new operating system/application data image to the filesystem can be performed by the supplier of the computer system, the user or by a third party such as an information systems support contractor. As the skilled reader will appreciate, the entity performing the installation, update or replacement of the software on the filesystem will be provided with full read/write access to the filesystem by the NFS server to allow the new software to be written onto the filesystem.

The arrangement of the present example also allows simple and quick backup of data. Since the (read-only) operating system and application data image is universal for the entire system and is typically imported from an external source, there is no need to backup the read-only portion of the COW filesystem. Therefore a backup operation need only be directed to the writeable areas of the filesystem, which is likely only to be a small total quantity of data relative to the total amount of data in the whole COW filesystem, and is much less than the amount of data which would need backing up if each server had its own local storage. Such backup operation could be performed over the internal networking connections of the computer system 1, for example by a connection from the switch 11 to a backup entity. Alternatively a direct out-of-band (OOB) backup connection could be provided to the NAS server 13.

FIG. 4 shows another example of a logical arrangement of the storage provided by the NAS server 13 on the physical disks 15. In this example, the boot code and application data are stored in common areas. Thus the whole filespace 61 is split into a read-only area 63 containing the boot code and application data for the servers 3, 5, 7, 9 and a writeable area 65. As with the example of FIG. 3, all of the servers 3, 5, 7, 9 of the present example are using the same operating system and run the same application software. The writeable area 65 is divided into portions allocated to each of the servers. Thus a partition 67 is allocated to server $S_0$, a partition 69 is allocated to server $S_1$, a partition 71 is allocated to server $S_2$ and a partition 73 is allocated to server $S_n$. In the present example, the writeable areas 67, 69, 71, 73 are allocated for the writing to of both boot-code and application data related information. In order to ensure that such written information is correctly used the next time that a server is restarted, the written information includes a pointer to the place in the read-only code where the written information belongs.

FIG. 5 shows a further example of a logical arrangement of the storage provided by the NAS server 13 on the physical disks 15. In this example, two different operating system/application software combinations are available for the servers. The service processor 12 of the example is operable to select an operating system/application software combination for each server. As shown in FIG. 5, the total storage space is divided into two NFS partitions 81 and 83. Each NFS partition 81, 83 contains complete operating system and application data code for the operation of a server under a given operating system/application data combination. Thus the example of FIG. 5 can be considered to be a dual version of the example of FIG. 4 in terms of its arrangement of storage.

The first NFS partition 83 comprises a read-only portion 85 and a plurality of server specific writeable portions 87. Likewise, the second NFS partition 85 comprises a read-only portion 89 and a plurality of server specific writeable portions 91. Therefore, upon boot or reboot of any one of the servers 3, 5, 7, 9, service processor 12 determines which operating system/application software combination the server is to use. The NAS server 13 is then instructed by the service processor 12 which NFS partition 81, 83 the server is to boot from to obtain the determined combination. The NAS server 13 thus directs the server's request for boot information to the appropriate NFS partition such that the server loads the determined operating system and application data without the need for any local configuration of the server. Any writes by the server to the storage are thus made to the NFS partition from which the boot code was read.

As will be appreciated, if the service processor 12 (or other management entity such as a load balancer (not shown)) determines during operation that the balance of servers running each of the operating system/application software combinations is sub-optimal, one or more selected servers can be stopped and restarted with an alternative one of the available combinations. Such allocations of which server(s) are to run which operating system/application data combination can also be predetermined on a time period basis. For example, if a first combination runs a website intended for European audiences and the second combination runs a website intended for US audiences, a system with five servers ($S_0$, $S_1$, $S_2$, $S_3$, $S_4$) could be preconfigured to run servers $S_0$ to $S_3$ on the European website and $S_4$ on the US website during a first time interval corresponding to night time in the US and daytime in Europe. The system can be preconfigured automatically to re-allocate servers $S_1$ to $S_3$ to the US website, leaving only $S_0$ running the European website during a second time interval corresponding to evening in Europe and daytime in the US.

Such allocation of servers to given operating system/application data combinations can be performed automatically, for example by DHCP (dynamic host configuration protocol). As each server within the computer system starts up, the server uses DHCP to request from the combined switch and service processor unit an NFS address to boot from (i.e. the location of the operating system/application data partition/area). The combined switch and service processor unit can monitor the number of servers booted to each possible combination to control the NFS addresses so distributed to ensure that the correct number of servers are booted to each combination. Thus there is no requirement for permanent or hard-configuration of which servers should be booted to which combination.

The servers 3, 5, 7, 9 can be configured automatically to boot from an operating system stored within the NFS filesystem by a number of methods. One such method can be used where the service processor 12 controls server usage. In this situation, the service processor 12 can be pre-configured with all available operating system/application software combinations, the path to each combination on the NAS server 13 and provisioning rules. The service processor 12 can then configure a network boot path for each server prior to the starting of the servers.

Another method can be used where DHCP (Dynamic Host Configuration Protocol) is used to control server usage. In this arrangement, a DHCP server (not shown) can be pre-configured with all available operating system/application software combinations, the path to each combination on the NAS server 13 and provisioning rules. Each server 3, 5, 7, 9 can be configured to perform a DHCP request upon initialisation and the DHCP server can respond with a boot path and boot parameters along with IP configuration information. In some examples, the DHCP server could be provided in the same physical entity as the NAS server or the service processor.

Another method can be used where the NAS server controls server usage. In this example, the NAS server 123 can be pre-configured with provisioning rules. Each server 3, 5, 7, 9 can be pre-configured to boot from the NAS server (such configuration can be implemented by a fixed configuration in the server, a configuration supplied by the service processor, or a configuration supplied by a DHCP server (not shown)) and the NAS server can take generic read/write requests from each server and decide which partition to use for that server.

The provision of a unified boot image (operating system and application data) for every server within the computer system, in addition to providing for speed of configuration for the entire system, also provides advantages of reliability and serviceability. By creating a situation whereby each server in the computer system runs from exactly the same operating system and application data image (or images where multiple combinations are required), the possibility of two servers running the same operating system and application data but having inconsistencies between them in terms of configuration is eliminated. Also, the servicing of the computer system to update an operating system or change application data is simple step of loading a new operating system/application data image onto the NFS partition for use by all servers. Thus a low management overhead, high reliability system is provided by the examples.

In another example, the NFS filesystem can contain a single common operating system for all servers and multiple application software images. Thus, upon startup of each server, a decision can be taken as to the software to be run on that server and the server can be booted from the common operating system and then directed to the appropriate application software files or partitions. As will be appreciated, such a system could be supplied by a manufacturer to a user with the operating system in place and setup for use by all of the servers, leaving the user to install their own application software for use by the servers. Such a system could enter service for the user with only a single application being provide and have further applications added over time as required by the user. As will be appreciated, to support the addition of such additional applications, additional servers could be added, as described above, to cope with any additional processing load created by the addition of extra applications.

Although the embodiments above have been described in considerable detail, numerous variations and modifications will become apparent to those skilled in the art once the above disclosure is fully appreciated. It is intended that the following claims be interpreted to embrace all such variations and modifications as well as their equivalents.

What is claimed is:

1. A computer system comprising:
   a plurality of processing modules, each mountable in a carrier rack and each including a processor and a volatile memory;
   a storage module including non-volatile memory, wherein the storage module is external to the plurality of processing modules and stores operating system instructions of a common operating system of the plurality of processing modules; and
   a switching module coupled to each of the plurality of processing modules and the storage module, wherein the switching module is configured to provide operating system instructions of the common operating system to each of the plurality of processing modules in order to permit each of the plurality of processing modules to execute the common operating system on its respective processor from its respective volatile memory.

2. The computer system of claim 1, wherein the storage module comprises a network attached storage server and a physical storage device, and wherein the physical storage device comprises a RAID arrangement.

3. The computer system of claim 1, wherein none of the plurality of processing modules includes non-volatile memory external to the processor that is usable to store program instructions of the common operating system.

4. The computer system of claim 1, wherein the storage module implements a copy on write filesystem.

5. The computer system of claim 1, wherein the storage module stores a plurality of information blocks, each block being usable by any of the plurality of processing modules, and wherein the switching module is configured to determine which information block is to be used by which of the plurality of processing modules.

6. The computer system of claim 1, wherein the storage module stores the operating system instructions of the common operating system in a read-only information block.

7. The computer system of claim 1, wherein the storage module is configured to allocate each a processing module a specific area of storage within the module.

8. The computer system of claim 1, wherein the storage module appears as a single writeable storage area to each processing module.

9. The computer system of claim 1, wherein the switching module is operable to perform a management service for the computer system.

10. The computer system of claim 9, wherein the switching module is connected to a management console for receipt of management commands.

11. The computer system of claim 9, wherein the switching module is further operable to perform at least one of the following functions: a firewall function, a load balancing function, an access control function and an encryption/decryption function.

12. The computer system of claim 1, wherein the switching module is operable to automatically configure an additional processing module added to the computer system.

13. The computer system of claim 1, wherein each processing module comprises identical hardware components.

14. The computer system of claim 1, wherein the switching module is configured to provide each processing module with a path to a downloadable file within the storage module, wherein the downloadable file includes operating system instructions of the common operating system.

15. The computer system of claim 14, wherein each processing module is configured to submit a DHCP request to the switching module in order to receive the path to the downloadable file.

16. A method comprising:
   storing, in a non-volatile memory, operating system instructions of an operating system common to each of a plurality of processing modules in a modular computer system; and
   providing program instructions of the operating system to each of the plurality of processing modules in order to permit each processing module to execute the operating system without having to store program instructions of the operating system in a non-volatile memory dedicated to that processing module.

* * * * *